United States Patent [19]

Smith

[11] Patent Number: 5,000,469

[45] Date of Patent: Mar. 19, 1991

[54] BICYCLE HANDLEBAR ARM RESTS

[76] Inventor: Cedric J. Smith, 19 Mount Ida Terr., Waltham, Mass. 02154

[21] Appl. No.: 364,623

[22] Filed: Jun. 9, 1989

[51] Int. Cl.$^5$ .................. B62K 21/12; B62K 21/26
[52] U.S. Cl. ................... 280/261; 74/551.1; 74/551.8; 74/551.9; 280/279
[58] Field of Search ............... 280/261, 279; 74/551.1, 74/551.8, 551.9

[56] References Cited

U.S. PATENT DOCUMENTS 4,873,886 10/1989 Renner .................. 74/551.8

FOREIGN PATENT DOCUMENTS 1134458 1/1985 U.S.S.R. .................. 74/551.1

Primary Examiner—Mitchell J. Hill
Attorney, Agent, or Firm—Robert T. Dunn

[57] ABSTRACT

A bicycle handlebar that connects to a steering post foreward of the bicycle seat has an adjustable support pad assembly for the rider on which to support his body at his forearms or elbows including a support member having a top side and a bottom side, of which the top side is adapted with cushioning to accommodate the rider's forearm or elbow in support thereof and clamped to the bicycle handlebar by a clamp assembly at said bottom side of said support member. The clamp assembly has a clamp band, a nut member within said band, a bolt member that engages said nut member and a hood member that spaces the band member from said bottom of the support member so that the support pad assembly is attachable to said handlebar and is adjustable thereon in two degrees of translational freedom and two degrees of rotational freedom.

12 Claims, 3 Drawing Sheets

BICYCLE HANDLEBAR ARM RESTS

BACKGROUND OF THE INVENTION

This invention relates to bicycle handlebar arm rests and more particularly to handlebar arm rests adapted for the rider to lean on comfortably and so support his upper body while gripping the handlebars to control the bicycle while riding it.

Heretofore, conventional bicycles used for competitive riding have had handlebar assemblies including a central stem that slides more or less vertically into the bicycle front wheel fork tube so that the stem extends adjustably upward from the fork tube and is then secured at a desired height. At the top of the stem is a clamp for the handlebar cross piece, which is usually a unitary piece that extends laterally (left and right), evenly on both sides of the bicycle and is equipped at its left and right ends with grips of some sort for the rider to hold with his left and right hands, respectively. Most often, on bicycles used for competitive riding, the left and right laterally extending parts of the unitary cross piece each turns forward, then downward and then returns back toward the rider and ends. These bends define sections of the total cross piece that are referred to herein as "forward", "downward" and "return" left or right sections of the unitary cross piece. The rider usually grips the left and right return sections with his left and right hands when riding strenuously (sprinting), and so his hands are then below the clamp at the top of the stem and below the cross piece. To do this the rider must bend at the waist, bringing his shoulders and arm down and foreward. In this position the rider is more streamlined (less wind resistance) and some contend that the rider can deliver more power to the pedals. However, in this position, the rider also becomes fatigued more quickly.

Heretofore, considerable effort has been made to provide similar handlebars on bicycles used for competitive riding, particularly for long distance riding, adapted with padding on the handlebar cross piece, on which the rider can rest by supporting himself at his forearms while still gripping the handles. Handlebars of this sort are described in U.S. Pat. No. 4,750,754, entitled Bicycle And Handlebar System, which issued June 14, 1988. Several structures are described in that patent having a conventional stem with a stem clamp at the top and a unitary crosspiece attached by the clamp. For all of these handlebar structures padding is provided on the cross piece immediately adjacent the clamp. Also on all of them, the left and right ends of the unitary cross piece first bend foreward, then inward and then upward to an end, and hand grips are provided on the upward section up to the ends. Thus, in operation, as compared with the conventional handlebars described above, the rider leans more foreward, but with his shoulders and arms higher and his hands much closer together and elbows well inside of the first (foreward) bend of the unitary cross piece.

Using the handlebar structures described in said U.S. Pat. No. 4,750,754, the rider, from time to time, can support his upper body with his forearms on the padding, even while gripping the handles and pedaling vigorously. In doing this, he is supporting his upper body on the handlebar cross piece and without the padding on the cross piece, this action would be very hard on his forearms. In time, this position becomes uncomfortable even with the padding, because the area of contact of his forearm with the cross piece is only a little greater with the padding and he is essentially resting his forearm on a transverse bar (the cross piece).

Handlebars similar to those shown in U.S. Pat. No. 4,750,754 have been provided with improved arm rests in the form of contoured pads that provide greater area of contact with the rider's forearm. These include separable pads that attach to the cross piece, each having a cushioned portion that may be contoured to about the shape of a substantial length of the forearm, so that a substantial part of the rider's forearm contacts the cushion. A clamp is provided on the bottom of the pad for attaching the pad assembly to the cross piece at a lateral position along the cross piece that the rider desires. Thus, such pads are adjustable in one translational direction (laterally along the cross piece) and one rotational direction (around the cross piece). Some riders find this provision for adjustment insufficient.

It is an object of the present invention to provide adjustable bicycle handlebar support pads wherein some or all of the above limitations of prior handlebar arm support pads such as described in the above patent and some of the improvements thereto are avoided.

It is another object of the present invention to provide adjustable bicycle handlebar support pads having additional translational and/or rotational adjustments that are readily manipulated for the comfort of the rider.

DESCRIPTION OF EMBODIMENTS OF THE INVENTION

Figure 1:
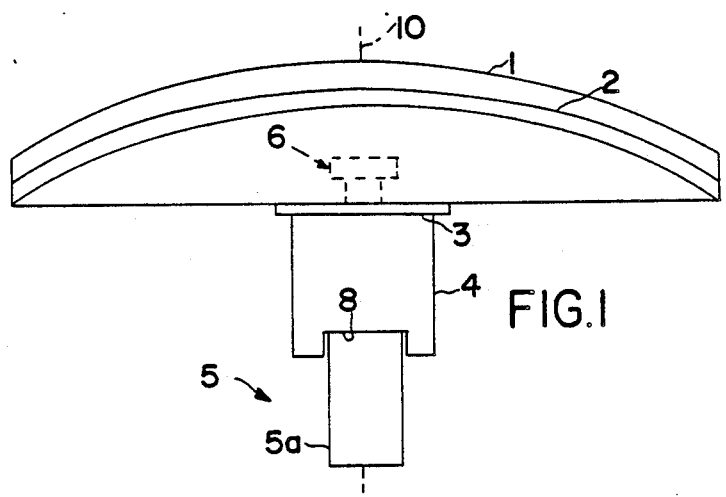
FIG. 1 is a side view of a bicycle handlebar rider's arm support pad assembly according to the present invention.
Figure 2:
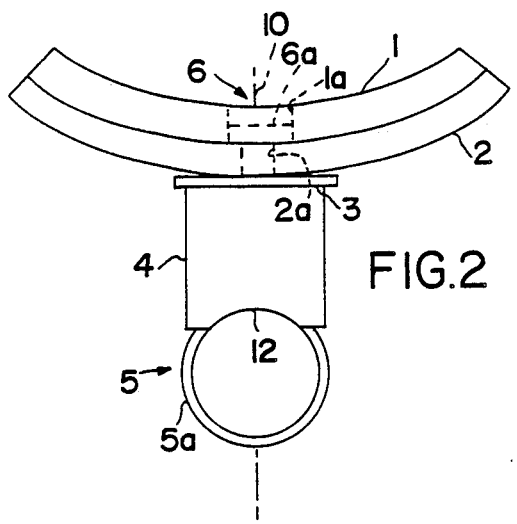
FIG. 2 is a front view of the support pad assembly.

FIGS. 1 and 2 show the pad assembly according to the present invention. The assembly includes rubber-like foam padding 1 affixed to contoured rigid plastic (or metal) cup 2. A hole at the center of the cup accommodates a bolt 6 and holds the bolt at the bolt head 6a, which is engaged at a socket therein. The threaded bolt shaft extends through washer 3 and hood 4 to nut 7 that is captured at the top of clamp 5. The head 6a of the bolt abuts the top of hole 2a in the cup. An access hole 1a adjacent the bolt head is provided in the padding 1 for an accommodating wrench to reach the bolt head socket.

Figure 3:
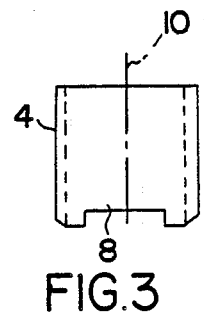
FIGS. 3, 4 and 5 are side, top and front views, respectively, of the hood member of the pad assembly according to the present invention.
Figure 5:
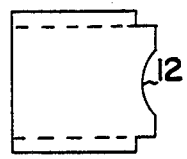
Figure 4:
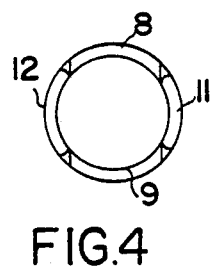

The hood member 4 is shown in detail by FIGS. 3 to 5. It is generally cylindrical in shape and defines an axis 10. Left and right side notches 8 and 9 at the bottom of the hood member engage and secure the clamp 5 to restrict rotational the position of the clamp with respect to the hood. Front and back arc recesses 11 and 12 follow the contour of the round bar (cross piece bar or longitudinal bar) that the clamp 5 clamps onto and bear against bar.

Figures 6, 7:
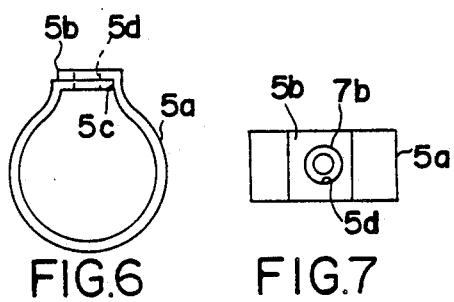
FIGS. 6 and 7 are front and top views, respectively of the clamp member of the pad assembly according to the present invention.
Figure 8:
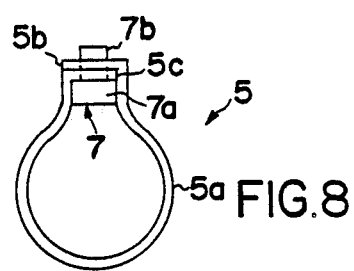
FIG. 8 is a front view of the clamp part of the pad assembly with the nut member attached thereto.

The clamp 5 and nut 7 are shown in FIGS. 6, 7 and 8. The clamp band 5a is preferable made of spring steel shaped to overlap at the top at 5b and 5c as shown in FIGS. 6 and 8. The overlapping ends 5b and 5c of the clamp are drilled providing hole 5d to accommodate the extended nut 7. More particularly, the nut base 7a is square and the extended part 7b of the nut makes a force fit through the hole 5d drilled through the overlapping ends of the clamp.

At assembly, the bolt 6 through the cup 2 extends through the washer 3 and hood 4 into the extending part 7b of the nut, and so the assembly is loosely held together. This loose assembly is then attached to the handlebar cross piece bar or the longitudinal bar by sliding it onto the bar at an end thereof. Then, the assembly is moved to the translational position on the bar that the rider desires and is rotated around the bar to the rotational position desired and the bolt is tightened using a wrench at the top of the pad. Before fully tightening the bolt, the longitudinal direction of the pad is adjusted by rotating the cup in the bolt axis. Then finally the bolt is tightened firmly, causing the hood to bear against the bar along the recesses 11 and 12 at one end of the hood and causing the other end of the hood to bear against washer 3, which is against the bottom of cup 2.

The height of the pad above the bar to which it is attached can be adjusted by the user by selecting a longer or shorter hood member along with a corresponding longer or shorter bolt. Thus, the pad position on the bar can be varied in two orthogonal translational directions and in two orthogonal rotational directions to the users satisfaction.

Figure 9:
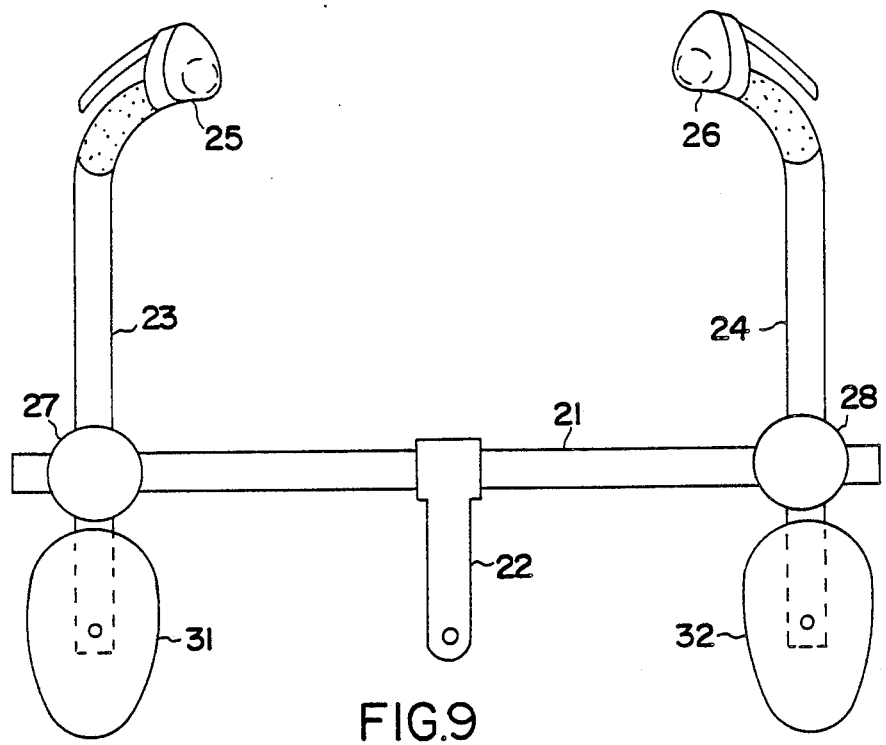
FIG. 9 is a top view showing the positions of the pads on the handlebars wherein the handlebars is an assembly of a separable cross piece bar and left and right longitudinal bars and handles that connect to the cross piece bar by two-way clamps.
Figure 10:
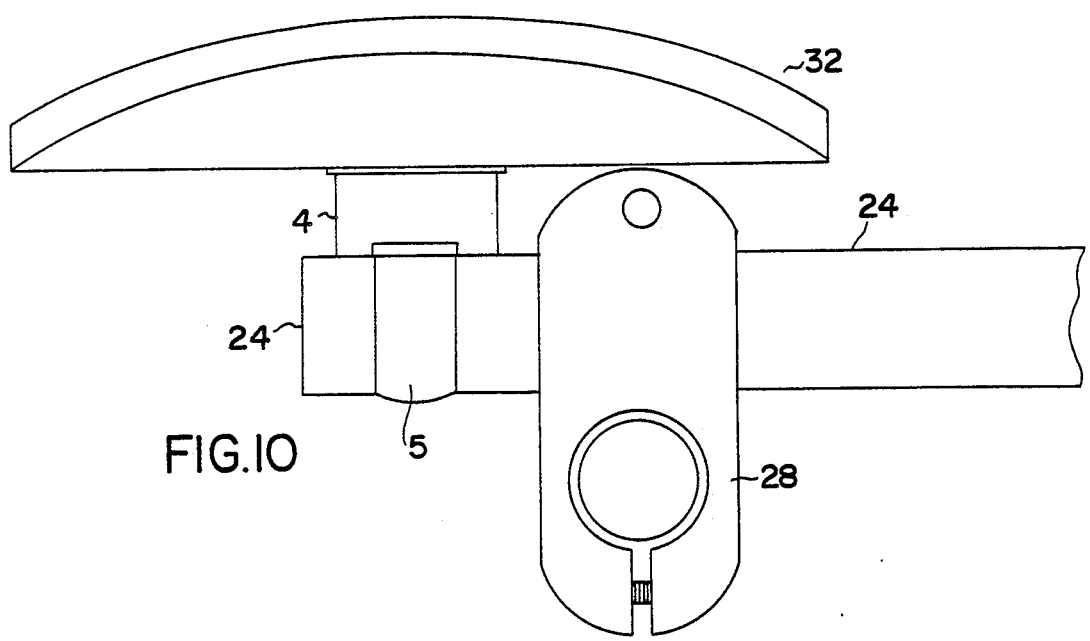
FIG. 10 is an enlarged side view showing the pad assembly attached to a longitudinal bar.

FIGS. 9 and 10 show a novel handlebar assembly for which the pad assemblies of the present invention are particularly suitable. The assembly includes a cross bar 21 clamped the steering stem 22 and having longitudinal members 23 and 24 with handles 25 and 26 at the front. The members 23 and 24 attach to the ends of cross bar 21 by two-way clamps 27 and 28. The pad assemblies 31 and 32 attach to members 23 and 24 at the back ends thereof that pass through the two-way clamps. An enlarged view of the two-way clamp, the bars and the pad is shown in FIG. 10.

Figure 11:
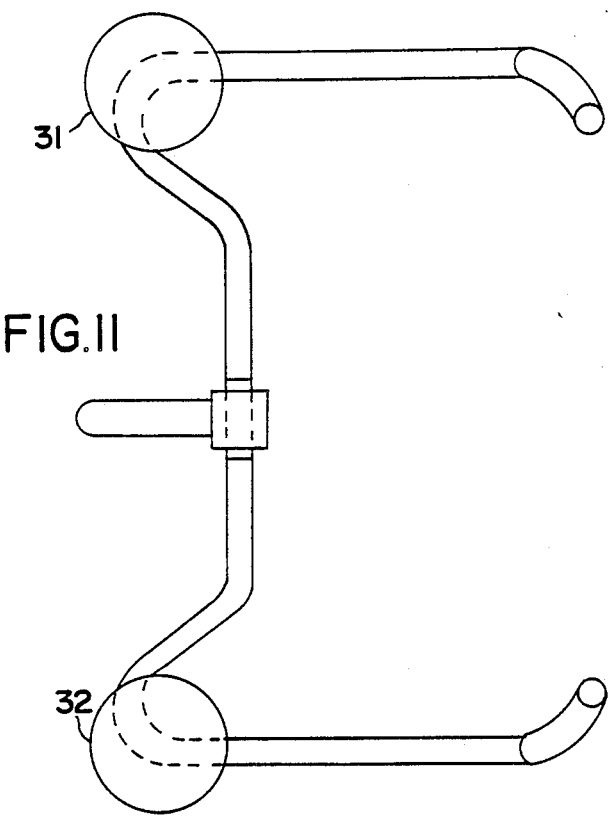
FIG. 11 is a top view showing the positions of the pad assemblies on handlebars wherein the handlebar cross piece is substantially a unitary piece.

FIG. 11 shows a top view of a novel handlebar assembly wherein the cross piece is substantially a unitary piece equipped with the support pad assemblies 31 and 32 according to the present invention.

Figure 12:
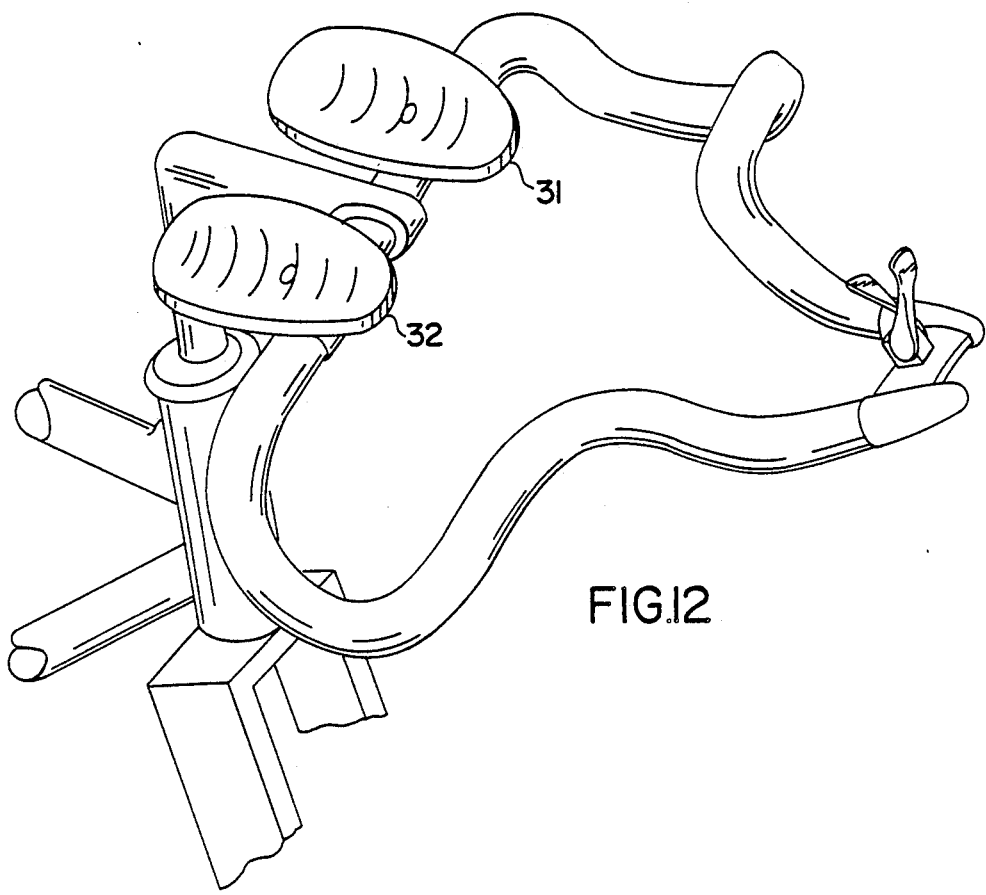
FIG. 12 is a perspective view of handlebars as described in U.S. Pat. No. 4,750,754 equipped with the pad assembly of the present invention.

FIG. 12 is a top view showing the positions of the support pad assemblies 31 and 32 on handlebars as described in U.S. Pat. No. 4,750,754.

The embodiments described herein are illustrative of the best known uses of the invention in an embodiment and shows several uses of that embodiment. Variations of that embodiment and its features may be made by those skilled in the art without departing from the invention set forth in the appended claims.

I claim:

1. On a bicycle handlebar that connects to a steering post forward of the bicycle seat and consists of one or more bar portions, an adjustable support pad assembly for use by the rider to support his body at his forearms or elbows comprising,
   (a) a support member having a top side and a bottom side, the top side being adapted to accommodate the rider's forearm or elbow in support thereof,
   (b) a clamp assembly attached to said bottom side of said support member,
   (c) said clamp assembly having a clamp band, a nut member within said band, a bolt member having a head and a threaded shaft of which said head engages said support member and said shaft threadably engages said nut member and a hood member that spaces said band member from said bottom of said support member, and
   (d) said band member fits around said handlebar bar portion and is secured thereto by tightening said bolt,
   (e) whereby said support pad assembly is attachable to said handlebar and is adjustable thereon in two degrees of translational freedom and two degrees of rotational freedom.

2. On a bicycle handlebar, a support member as in claim 1, including,
   (a) two or more of said support members attached to said handlebar at the left and right sides thereof for supporting the rider of said bicycle at the riders forearm or elbow while the rider rides the bicycle grasping said handlebar.

3. On a bicycle handlebar, a support member as in claim 1, wherein,
   (a) said two degrees of rotational freedom are: around said handlebar bar portion; and about an axis defined by said bolt member perpendicular to said handlebar bar portion.

4. On a bicycle handlebar, a support member as in claim 1, wherein,
   (a) said two degrees of translational freedom are: along said handlebar bar portion; and along an axis defined by said bolt member perpendicular to said handlebar bar portion.

5. On a bicycle handlebar, a support member as in claim 1, wherein,
   (a) said two degrees of rotational freedom are: around said handlebar bar portion; and about an axis defined by said bolt member perpendicular to said handlebar bar portion and
   (b) said two degrees of translational freedom are: along said handlebar bar portion; and along an axis defined by said bolt member perpendicular to said handlebar bar portion.

6. On a bicycle handlebar, a support member as in claim 1, wherein,
   (a) said clamp band encircles said bar portion of said handlebar,
   (b) said hood member has two ends of which one of said ends bears against said bar portion and the other of said ends bears against said support member bottom and
   (c) said bolt and nut member engagement adjusts the force of said hood member bearing against said bar portion.

7. On a bicycle handlebar, a support member as in claim 1, wherein,
   (a) said hood member is a cylinder of which one end bears against said handlebar bar portion and the other of said ends bears against said support member bottom.

8. On a bicycle handlebar, a support member as in claim 7, wherein,
   (a) the translational position of said support member in one of said translational degrees of freedom is proportional to the length of said hood member cylinder.

9. On a bicycle handlebar, a support member as in claim 8, wherein,
   (a) the translational position of said support member in the other one of said translational degrees of freedom is varied by varying the translational position of said clamp band along said handlebar bar portion.

10. On a bicycle handlebar, a support member as in claim 9, wherein,
    (a) said two translational degrees of freedom are perpendicular to each other.

11. On a bicycle handlebar, a support member as in claim 7, wherein,
    (a) the rotational position of said support member in one of said rotational degrees of freedom is varied by varying said clamp band rotational position on said handlebar bar portion.

12. On a bicycle handlebar, a support member as in claim 11, wherein,
    (a) the rotational position of said support member in the other one of said rotational degrees of freedom is varied by varying said support member rotational position on the axis of said hood member cylinder.

* * * * *